(12) United States Patent
Shen et al.

(10) Patent No.: US 7,945,741 B2
(45) Date of Patent: May 17, 2011

(54) RESERVATION REQUIRED TRANSACTIONS (75) Inventors: Xiaowei Shen, Hopewell Junction, NY (US); Karin Strauss, Urbana, IL (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 11/775,096

(22) Filed: Jul. 9, 2007

(65) Prior Publication Data

US 2009/0019209 A1   Jan. 15, 2009

(51) Int. Cl.
*G06F 12/00* (2006.01)
(52) U.S. Cl. .................. 711/150; 711/147; 712/E9.038
(58) Field of Classification Search .......... None
See application file for complete search history.

(56) References Cited

U.S. PATENT DOCUMENTS 6,275,907 B1 * 8/2001 Baumgartner et al. ....... 711/143
2008/0256073 A1 * 10/2008 Detlefs et al. ..................... 707/8

* cited by examiner

*Primary Examiner* — Hetul Patel
*Assistant Examiner* — John P Fishburn
(74) *Attorney, Agent, or Firm* — F. Chau & Associates, LLC; Daniel P. Morris, Esq.

(57) ABSTRACT

A computer readable medium is provided embodying instructions executable by a processor to perform a method for performing a transaction including a transaction head and a transaction tail, the method includes executing the transaction head, including executing at least one memory reserve instruction to reserve a transactional memory location that are accessed in the transaction and executing the transaction tail, wherein the transaction cannot be aborted due to a data race on that transactional memory location while executing the transaction tail, wherein data of memory write operations to the transactional memory location is committed without being buffered.

6 Claims, 4 Drawing Sheets

| PROGRAMMER'S CODE | PROGRAM AFTER TRANSFORMATION (RRT) |
|---|---|
| transaction_start | transaction_start |
| ld A | res_r A |
| st B | ld A |
| ld C | res_w B |
| st D | st_t B' |
| . | res_r C |
| . | ld C |
| . | res_w D |
| transaction_end | st_t D' |
| | . |
| | ................... NO MORE RESERVATIONS |
| | . |
| | mv B', B |
| | mv D', D |

FIG. 3A

PROGRAMMER'S CODE IN C

```
double transferFunds(Account *src, Account *dst, double amount)
{
        transaction_start()
                src->balance -= amount;
                dst->balance += amount;
        transaction_end();

return amount;
}
```

FIG. 3B
PROGRAMMER'S CODE IN POWERPC ASSEMBLY

```
transaction_start
    lfd  f1, 16(sp)    // loads amount into f1
    ld   r1, 0(sp)     // loads src into r1
    lfd  f2, 0(r1)     // loads src->balance into f2
    fsub f3, f2, f1    // subtracts amount from src->balance
    stfd f3, 0(r1)     // stores new balance back to src->balance
    ld   r2, 8(sp)     // loads dst into r2
    lfd  f4, 0(r2)     // loads dst->balance into f4
    fadd f5, f4, f1    // adds amount to dst->balance
    stfd f5, 0(r2)     // stores new balance back to dst->balance
transaction_end
```

FIG. 3C
POWERPC CODE TRANSLATED INTO RRT INSTRUCTIONS

```
transaction_start
    res_r   16(sp)        // reserves &amount
    lfd   f1, 16(sp)      // loads amount into f1
    res_r   0(sp)         // reserves &src
    ld    r1, 0(sp)       // loads src into r1
    res_r   0(r1)         // reserves &(src->balance)
    lfd   f2, 0(r1)       // loads src->balance into f2
    fsub  f3, f2, f1      // subtracts amount from src->balance
    res_w   0(r1)         // reserves &(src->balance) – this time for writing too
    stfd_t f3, 24(sp)     // stores src->balance to temporary storage
    res_r   8(sp)         // reserves &dst
    ld    r2, 8(sp)       // loads dst into r2
    res_r   0(r2)         // and reserves &(dst->balance)
    lfd   f4, 0(r2)       // loads dst->balance into f4
    fadd  f5, f4, f1      // adds amount to dst->balance
    res_w   0(r2)         // reserves &(dst->balance) – this time for writing too
    stfd_t f4, 32(sp)     // stores dst->balance to temporary storage
    lfd   f3, 24(sp)      // reloads src->balance from temporary storage
    lfd   f4, 32(sp)      // reloads dst->balance from temporary storage
    stfd  f3, 0(r1)       // stores src->balance to permanent storage
    stfd  f4, 0(r2)       // stores dst->balance to permanent storage
transaction_end
```

RESERVATION REQUIRED TRANSACTIONS

BACKGROUND OF THE INVENTION

1. Technical Field

The present invention relates to a system and method for supporting for atomic transactions, and more particularly to a system and method for reservation required transactions (RRT).

2. Description of Related Art

Atomic transactions have been widely used in parallel computing and transaction processing. An atomic transaction generally refers to the execution of multiple operations, such that the multiple operations appear to be executed together without any intervening operations. For example, if a memory address is accessed within an atomic transaction, the memory address should not be modified elsewhere until the atomic transaction completes. Thus, if a processor (or a thread in a multithreading environment) uses an atomic transaction to access a set of memory addresses, the atomic transaction semantics should guarantee that another processor (or another thread) cannot modify any of the memory addresses throughout the execution of the atomic transaction.

Atomic transactions can be implemented at architecture level via proper architecture and micro-architecture support, rather than at software level via semaphores and synchronization instructions. Architecture-level atomic transactions can potentially improve overall performance using speculative executions of atomic transactions as well as elimination of semaphore uses. Furthermore, architecture-level atomic transactions can improve productivity because programmers no longer need to worry about using semaphores to achieve desired atomicity semantics.

Supporting atomic transactions architecturally often requires expensive hardware and software enhancements, such as large on-chip buffers for data of uncommitted atomic transactions, and software-managed memory regions for on-chip buffer overflows. Various architecture mechanisms supporting atomic transactions have been proposed. Architecture support of atomic transactions needs to provide conflict detection between atomic transactions, and data buffering for uncommitted atomic transactions. Conflict between different atomic transactions accessing same memory locations is usually detected by hardware on-the-fly. This can be achieved with reasonable implementation cost and complexity because the underlying cache coherence mechanism of the system can be used. However, it can be quite challenging to buffer data for uncommitted transactions with reasonable cost and complexity, if an atomic transaction can modify a large number of memory locations that cannot fit in an on-chip buffer (either a dedicated buffer or on-chip L1/L2 caches).

Existing architecture support of atomic transactions either requires that an atomic transaction ensure buffer overflow cannot happen, or fall back to some software solution when buffer overflow happens. The first approach inevitably limits the use of atomic transactions. The second approach often requires software to acquire some semaphore such as a global lock (that protects the whole address space) to ensure atomicity of memory accesses. It should be noted that when a thread is using a semaphore to protect a memory region, other threads accessing the memory region must use the same semaphore to ensure mutual exclusion. This hardware-software approach of handling buffer overflow is often inefficient and complex.

Therefore, a need exists for a system and method for reservation required transactions.

SUMMARY OF THE INVENTION

According to an embodiment of the present disclosure, a computer readable medium is provided embodying instructions executable by a processor to perform a method for performing a transaction including a transaction head and a transaction tail, the method includes executing the transaction head, including executing at least one memory reserve instruction to reserve a transactional memory location that are accessed in the transaction and executing the transaction tail, wherein the transaction cannot be aborted due to a data race on that transactional memory location while executing the transaction tail, wherein data of memory write operations to the transactional memory location is committed without being buffered.

According to an embodiment of the present disclosure, a computer readable medium is provided embodying instructions executable by a processor to perform a method for executing a transaction. The method includes providing a buffer to hold data for uncommitted memory write operations of a regular transaction, converting the regular transaction to a reservation-required transaction (RRT) upon the buffer overflowing for the uncommitted memory write operations of the regular transaction, reserving, in the RRT, every memory location the RRT intends to read or modify before issuing a store operation to a transactional memory address, wherein the transactional memory address is guaranteed to maintain a most recent value recorded before the RRT is started if the RRT is aborted, and wherein the reservation allows all memory locations accessed by the RRT to be reserved in advance, which guarantees completion of the RRT if a store operation to a transactional memory address is executed, and aborting the RRT before the store operation to the transactional memory address is executed if reservation of any transactional memory address of the RRT cannot be completed.

According to an embodiment of the present disclosure, a computer readable medium is provided embodying instructions executable by a processor to perform a method for transforming a non-reserve-required transaction (RRT) to an RRT-compliant transaction includes re-ordering operations of the non-RRT, wherein a memory store operation is re-ordered to be performed after a reserve-complete operation, inserting, for each memory load or store operation to a transactional memory location, code to search a corresponding address mapping table, and using a temporary memory address to replace the transactional memory address in the code if the temporary memory address is found.

According to an embodiment of the present disclosure, a micro-architecture support for reserve-required transactions (RRT) includes a memory device storing a RRT, a processor for performing operations of the RRT, a hash-table for address reservation tables, including a read address reservation table (RART), a write address reservation table (WART) for each RRT, and an address reservation table (ART) for recording physical addresses reserved by the RRT, and a state machine for recording a state of the processor during execution of the RRT.

BRIEF DESCRIPTIONS OF THE DRAWINGS

Preferred embodiments of the present disclosure will be described below in more detail, with reference to the accompanying drawings:

FIGS. 3A-C are exemplary code for transformations according to an embodiment of the present disclosure;

DETAILED DESCRIPTION OF PREFERRED EMBODIMENTS

According to an embodiment of the present disclosure, support for atomic transactions is provided by a Reservation-Required Transactions (RRT) architecture. Baseline architecture support of RRT maintains no buffer space to hold data for uncommitted transactions. To achieve this, RRT partitions a transaction into two non-overlapping phases, including a transaction head and a transaction tail. The transaction can be aborted during the transaction head phase when a conflict is detected with another transaction. During the transaction head phase, speculative data produced by memory write operations is maintained in the program (e.g., by the compiler or runtime) using temporary, non-transactional, memory locations. If a transaction has entered the transaction tail phase, the transaction cannot be aborted and is guaranteed to complete. As a result, data of memory write operations performed in the transaction tail phase can be committed to the memory without being temporarily buffered.

An optimized RRT implementation allows RRT to be combined with a buffer-based solution to achieve improved overall performance and productivity. According to an embodiment of the present disclosure, complex buffer overflow handling is eliminated without sacrificing performance or productivity.

Embodiments of the present invention include, inter alia, the partitioning of a transaction into the transaction head and the transaction tail phases, and use of memory reserve instructions; the combination of RRT and buffer-based solutions; transformations from non-RRT-compliant transactions to RRT-compliant transactions; and efficient micro-architecture support for RRT.

Referring to the partition of a transaction into transaction head and transaction tail phases, and use of memory reserve instructions; the present invention comprises an architecture interface that allows software to reserve memory addresses in the transaction head phase. A transaction is referred to as an RRT-compliant transaction, if all transactional memory locations accessed in the transaction are reserved in the transaction head phase.

The execution of a transaction includes two non-overlapping phases, the transaction head and the transaction tail. During the transaction head phase, the transaction executes one or more memory reserve instructions to reserve transactional memory locations that are accessed in the transaction. An optimization allows the transaction to execute a memory-reserve-for-load instruction to reserve one or more transactional memory locations for load operations (i.e. the reserved memory locations will only be accessed by memory read operations in the transaction). No memory write operation to a transactional memory location is allowed in the transaction head phase. Thus, if the transaction in the transaction head phase is aborted, memory locations modified in the transaction are not recovered. Semantically, a memory reserve instruction ensures that a transactional memory address is reserved so that, once the transaction enters the transaction tail phase, the transaction cannot be aborted due to a data race on that transactional memory location. Once the transaction enters the transaction tail phase, it is guaranteed that the transaction will never be aborted, allowing data of memory write operations to transactional locations to be committed to the memory without being buffered.

Referring to the combination of RRT and buffer-based solutions; A buffer-based transaction solution uses a buffer (e.g., a dedicated on-chip buffer or an on-chip L1/L2 cache) to hold data for uncommitted memory write operations of a transaction. It can support transactions effectively provided that the size of transactions does exceed the buffer size. The RRT solution provides a hardware-software solution that allows data of memory write operations to be committed to the memory. The RRT solution can be seamlessly combined with a buffer-based solution (e.g., Best Effort Transactions) so that common cases in which transactions fit in the buffer can be supported efficiently, while uncommon cases in which transactions cause buffer overflows can be supported reasonably well.

Restricting the supported set of atomic transactions to a constrained subset helps simplify the implementation of transactional memory hardware, and possibly improve the hardware's performance when executing atomic transactions. In order to efficiently execute arbitrary atomic transactions with hardware that supports only a constrained subset of atomic transactions there must be a transformation that maps every possible type of atomic transaction into an atomic transaction that belongs to this constrained subset of atomic transactions and the constrained subset of atomic transactions must be efficiently supported by the underlying hardware.

Distinguishing between atomic transactions at the programming level and atomic transactions at the architecture level. Atomic transactions at the programming level are arbitrary atomic transactions as written by a programmer. Atomic transactions at the architecture level, however, are atomic transactions as presented to the hardware. There may be a transformation that is applied to programming level atomic transactions to map programming level atomic transactions to architecture level atomic transactions that are in turn presented to the hardware for execution.

BET (Best-Effort Transactions) restricts the number of different cache lines that can be accessed by a given atomic transaction. This restriction implies that atomic transactions meant to fully leverage the hardware support offered by BET need to have limited memory footprint such that they do not overflow the cache that keeps track of addresses accessed by the atomic transaction and stores uncommitted data generated by the atomic transaction. Because BET restricts the memory footprint of transactions, BET by itself cannot execute an arbitrary atomic transaction Reservation Required Transactions (RRT) are implemented to support a subset of all the atomic transactions (architecture level transactions) such that any existing programming level atomic transaction not in the subset can be mapped to an equivalent architecture level atomic transaction in this subset by a transformation (arrow), which can be executed by RRT hardware.

In order to effectively support atomic transactions, two capabilities are needed from a transactional memory system (includes hardware and software): to keep uncommitted data generated by an atomic transaction; and to detect conflicts (atomicity violations) between atomic transactions Typically, keeping arbitrary amounts of uncommitted data is difficult to implement in hardware because of the hardware's lack of flexibility. On the other hand, detecting conflicts is easier to implement in hardware because the detection can build on pre-existing mechanisms, such as a pre-existing cache coherence mechanism. Hardware is used to detect conflicts between atomic transactions while software should is to manage uncommitted data generated by atomic transactions.

Figure 1:
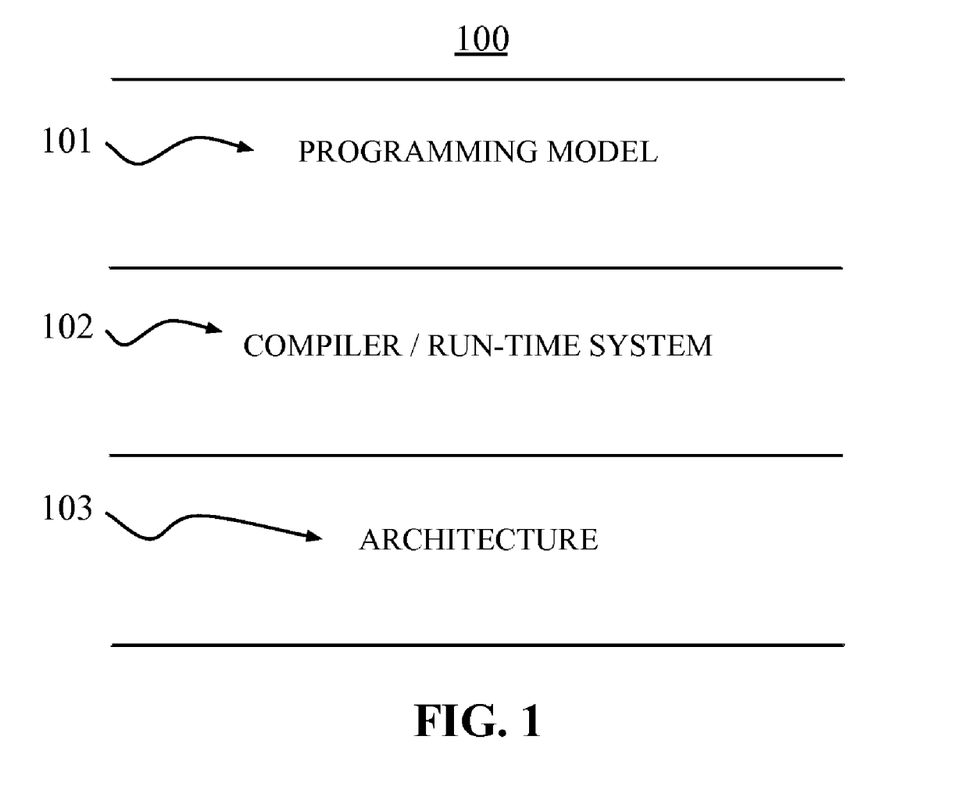
FIG. 1 shows layer of an RRT system according to an embodiment of the present disclosure.

FIG. 1 shows the different layers of an RRT system 100. The programming model 101 exposed to the programmer is simple. Two primitives are provided, one to start and one to conclude an atomic transaction. The Compiler/Run-Time System 102 applies the necessary transformations to the code such that an atomic transaction written only with the above primitives by the programmer without any restrictions is mapped to an atomic transaction supported by RRT. The Architecture 103, in turn, only supports RRT atomic transactions, but does it efficiently. Having the Compiler/Run-Time System 102 apply the needed transformations to the code as described above is the recommended approach, but nothing prevents the programmer from coding a transaction using RRT at the architecture level.

In order for RRT to support a subset of atomic transactions efficiently, an atomic transaction reserves every memory location the atomic transaction intends to read or modify before the atomic transaction issues any store to transactional addresses. Transactional addresses are addresses guaranteed to maintain the last value they recorded before an atomic transaction started if that atomic transaction is aborted. The purpose of the reservation is to allow all memory locations accessed by a given atomic transaction to be reserved in advance, which guarantees the given atomic transaction's completion if a store from that given transaction is executed (if reservation of any of the addresses cannot be guaranteed by the RRT system 100, the given atomic transaction is aborted and no store to transactional memory is ever executed).

From this point on, atomic transactions are called transactions for conciseness.

Referring to the transformation from non-RRT-compliant transactions to RRT-compliant transactions. For each memory store operation to a transactional memory location, if the memory store operation can be re-ordered so that it can be performed after the reserve-complete operation, the compiler performs the re-ordering. Otherwise, the compiler performs the memory store operation to a temporary memory location (instead of the transactional memory location), and records the mapping from the transactional memory location to the temporary memory location in a software-managed address mapping table. Meanwhile, the compiler inserts instructions at the end of the transaction to copy data from the temporary memory location to the transactional memory location.

For each memory load or store operation to a transactional memory location, the compiler inserts code to search the corresponding address mapping table. If a temporary memory address is found, the compiler uses the temporary memory address to replace the transactional memory address in the code.

As described above, RRT are visible to the Compiler/Run-time System. The interface exposed to the programmer is simple, only providing instructions to start and conclude a transaction. The Compiler/Run-time System is responsible for performing a transformation that maps an ordinary transaction into an RRT.

Figure 2:
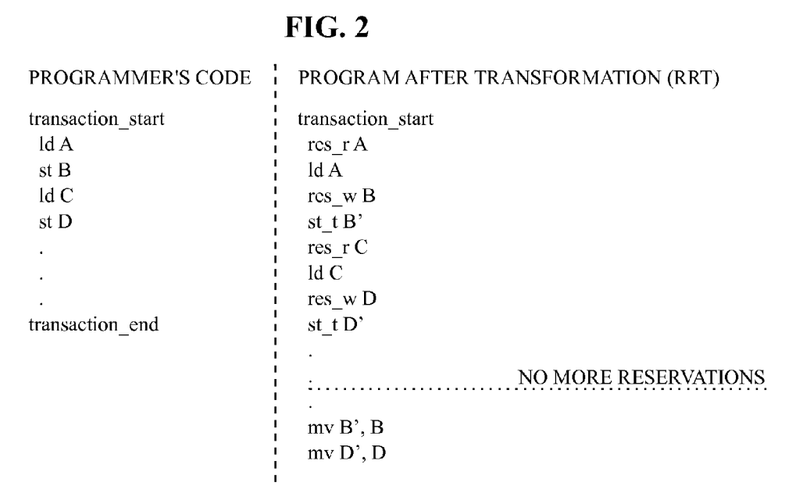
FIG. 2 is an exemplary transformation according to an embodiment of the present disclosure.

FIG. 2 shows a transformation example. FIG. 2 shows pseudo-code of a series of loads and stores. For each load in the original code, the transformation generates a reservation and a load instruction. For each store in the original code, the transformation generates a reservation instruction, a store instruction to a non-transactional, temporary location and, after all reservation instructions, another operation that moves data from non-transactional memory locations to transactional ones. Notice that there are two distinct reservation operations, one (res_r) for addresses that will only be read by a transaction and another (res_w) for addresses that may be written and read by the transaction.

Figure 3A:
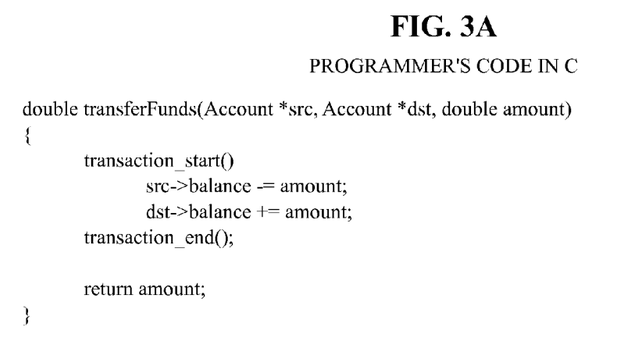

FIGS. 3A-C provide a more realistic example of this translation from the programmer's code—FIG. 3A shows C code and FIG. 3B shows PowerPC assembly code—to FIG. 3C shows a transaction that can be supported by a RRT system. Assume, for this example, that src->balance and dst->balance do not alias (i.e. are not stored in the same memory address). Additional exploration, including the case in which there is aliasing, is presented herein In FIG. 3C, every load instruction is transformed into a reservation instruction that reserves the address to he accessed by the load in a read address reservation table (res_r) and the load instruction itself. The original store instructions from FIG. 3B were transformed into four other instructions: (1) a res_w instruction that reserves the address to be accessed by the store in a read/write address reservation table, (2) an stfd_t. instruction that stores the data generated by the store into a temporary non-transactional location (on the stack); (3) an lfd instruction that loads the data generated by the store from the temporary non-transaction and location; and (4) an stfd instruction that stores the data to the original location intended by the programmer (transactional location). It is important to notice that (3) and (4) are placed after all necessary reservations. This guarantees that any store to a transactional location is performed after all reservations are granted. It is also important to notice that some of the additional instructions can be eliminated. For example, consider FIG. 3C once again: since &(src->balance) is reserved by both res_r 0(r1) and res_w 0(r1), some redundancy can be eliminated by eliminating the res_r 0(r1) instruction. Also, if desired, the read and write address reservation tables can be implemented as a single address reservation table. In that case, the res_r and res_w instructions would be implemented by a single res instruction.

Referring now to the efficient micro-architecture support for RRT; The present invention comprises a hash-table implementation for address reservation tables, which is the data structure for architecture support of RRT. Snoops of address reservation tables can be seamlessly integrated with the underlying cache coherence mechanism.

In order to record information about addresses currently reserved by a transaction running on a processor, one read address reservation table (RART) and one write address reservation table (WART) per transaction can be used. Each address reservation table (ART) records every physical address reserved by a given transaction (recording physical addresses in an ART is preferred to avoid page aliasing issues). Notice that an ART can store the exact set of reserved addresses with a one-to-one mapping between addresses and entries, but in this case there may be more addresses to be stored than entries to store them and the table storage space might not be sufficient. Alternatively, an ART can store a superset of the reserved addresses. Due to the superset encoding, all reserved addresses can always be encoded in the structure, but a group of addresses may be mapped into the same ART entry. The mapping of multiple addresses to the same ART entry may cause performance degradation due to the increased possibility of conflicts between transactions (a transaction may reserve more addresses than the transaction actually needs), but correctness is preserved. It is worth pointing out that removal of individual addresses is not necessary.

Elements only have to be removed from the ART on transaction abort or commit, at which point the whole ART can be cleared.

For example, ARTs can be implemented as a bloom filter structures. When an address is added to a bloom filter structure, a number of hash functions are computed using the address to be inserted. Each of the hash functions generates a bit pattern that is used to index an array of bits. Each indexed bit is then set (these bits are initially reset). Because of the hash-based encoding, a bloom filter effectively encodes a superset of all reserved addresses. In a bloom filter, individual removal of elements is not trivial. However, this is not a problem because no individual element removal is necessary in an ART, as pointed out in the above paragraph. When an ART needs to be cleared, it is sufficient to reset all of the bits in the bloom filter array.

The read and write ARTs can be implemented as a unified ART.

In order to record a processor state regarding transactions, a state machine can be used. The states used to express possible operation modes include: not in transaction (TRAN-PRE), in transaction with reservations allowed (TRAN-RSV) and in transaction with reservations not allowed (TRAN-TAIL). If a processor is in state TRAN-PRE, the processor is not executing a transaction. If a processor is in state TRAN-RSV, the processor is executing a transaction and reservations are allowed (although stores to transactional addresses are not allowed). If a processor is in state TRAN-TAIL, the processor is executing a transaction and reservations are no longer allowed (but stores to transactional addresses are allowed).

Figure 4:
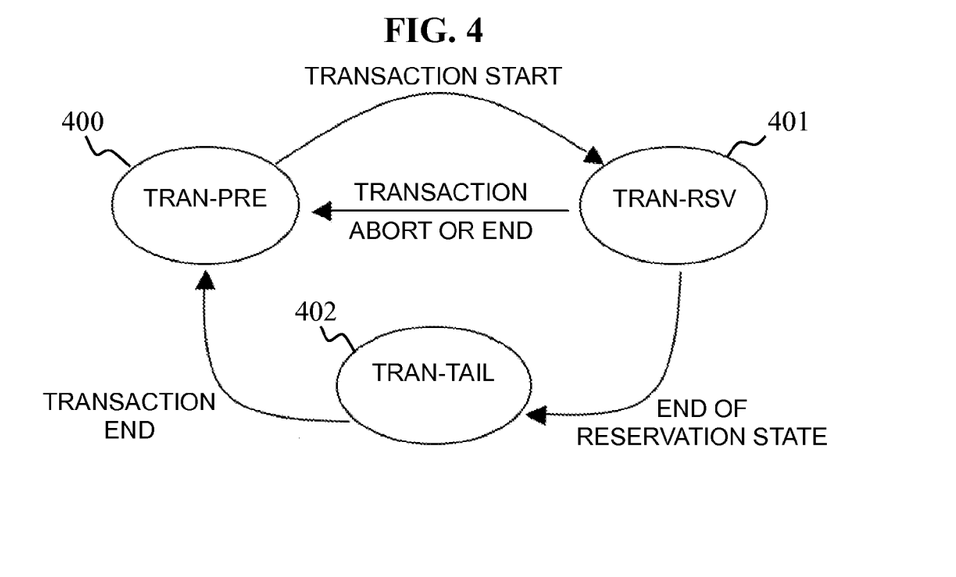
FIG. 4 is a state transition diagram according to an embodiment of the present disclosure.

Referring to the state transition diagram shown in FIG. 4, a processor is initially in TRAN-PRE state 400. When the processor starts a transaction, the processor transitions to the TRAN-RSV state 401. Once all reservations are completed, the processor may transition to the TRAN-TAIL state 402. When a processor ends or aborts a transaction, the processor transitions back to the TRAN-PRE 400 state.

If transaction nesting support is required, an additional transaction nesting counter can be maintained. When a new transaction starts, the transaction nesting counter is incremented. When a transaction completes, the transaction nesting counter is decremented, in this case, the processor transitions from the TRAN-PRE state 400 to TRAN-RSV state 401 when the counter is incremented from 0 to 1. Also, the processor only transitions back to the TRAN-PRE state 400 when the counter is decremented down to 0 again. One behavior that needs to be defined when supporting transaction nesting is whether an abort signal to an inner transaction also causes the outer transactions to abort or not. If the outermost transactions are aborted on an inner transaction abort, only one read and one write ART need to be maintained for all the transactions. If the outermost transactions are not aborted on an inner transaction abort, each transaction has to maintain separate read and write ARTs.

Referring to the operation description, RRT can be efficiently implemented with proper coherence layer enhancements. The implementation technique is applicable to any of a variety of coherence protocols, such as the protocol found in the IBM® Power4 systems and directory-based protocols found in large-scale shared-memory systems.

When a given processor starts a transaction, a RART and a WART are assigned to the started transaction and the processor transitions to the TRAN-RSV state.

When a read reservation operation is performed by a given processor on behalf of a transaction regarding an address, a read reservation request with the address to be reserved is sent to other processors. If the response to the read reservation request from the other processors does not carry an abort signal, the address is recorded in the RART allocated to the given transaction. If the response to the read reservation request from the other processors does carry an abort signal, the transaction is aborted.

When a write reservation operation is performed by a given processor on behalf of a transaction regarding an address, a write reservation request with the address to be reserved is sent to other processors. If the response to the write reservation request from the other processors does not carry an abort signal, the address is recorded in the WART allocated to the given transaction. If the response to the write reservation request from the other processors does carry an abort signal, the transaction is aborted.

When a read reservation request arrives at a given processor, the hardware searches the local WART for the requested address. If the requested address is not found in any of the local WARTs, a regular acknowledgement response is sent back to the requester. Otherwise, if the requested address is found in any of the local WARTs, different actions may be taken according to the current state of the given processor. If the processor is in state TRAN-TAIL, a response with an abort signal is sent back to the requester. If the processor is in state TRAN-RSV, a fairness mechanism is activated and decides whether to send a response with an abort signal back to the requester and continue executing the local transaction or to send a regular acknowledgement response back to the requester and abort the local transaction.

When a write reservation request arrives at a given processor, the hardware searches all ARTs for the requested address (RARTs and WARTs). If the requested address is not found in any of the local ARTs, a regular acknowledgement response is sent back to the requester. Otherwise, if the requested address is found in any of the ARTs, different actions may be taken according to the current state of the given processor. If the processor is in state TRAN-TAIL, a response with an abort signal is sent back to the requester. If the processor is in state TRAN-RSV, a fairness mechanism is activated and decides whether to send a response with an abort signal back to the requester and continue executing the local transaction or to send a regular acknowledgement response back to the requester and abort the local transaction.

When a given transaction is aborted, the ARTs assigned to the given transaction are freed and cleaned and the processor transitions to the TRAN-PRE state.

When a temporary store operation (e.g. stfd_f4, 32(sp) from FIG. 3C) is performed by a given processor on behalf of a transaction regarding an address, the temporary store is handled as a regular store, as if no transaction were in progress.

When a store operation is performed by a given processor on behalf of a transaction regarding an address and the given processor is in TRAN-RSV state, the processor transitions to TRAN-TAIL state. Then, the store is handled as a regular store.

When a given processor completes a transaction, the processor commits the executing transaction. In order to commit the executing transaction, the hardware clears and frees the ARTs assigned to the transaction and transitions to the TRAN-PRE state.

In an exemplary embodiment of the present invention, each processor maintains an address reservation table for each thread, wherein the address reservation table records all memory addresses that have been reserved by the corresponding thread.

When a transaction (running in a thread) performs a memory-reserve instruction to reserve a memory address, the memory address is recorded in the corresponding address reservation table. Meanwhile, a reservation-snoop request is sent to all other processors so that their address reservation tables can be checked. The processor that issues the reservation-snoop request is referred to as the requesting processor, and the processors that receive the reservation-snoop request are referred to as the snooping processors.

When a snooping processor receives a reservation-snoop request, the snooping processor checks its own address reservation tables to determine if the memory address is reserved at the snooping processor. If the memory address is found, a conflict is detected between a transaction on the requesting processor and a transaction on the snooping processor. There are two possible scenarios. If the transaction on the snooping processor is in the transaction tail phase (and thus cannot be aborted), the snooping processor sends an abort signal in its snoop response to the requesting processor so that the transaction on the requesting processor will be aborted. If the transaction on the snooping processor is in the transaction head phase (and thus can be aborted), the snooping processor either aborts its own transaction, or sends an abort signal to the requesting processor to abort the transaction on the requesting processor. An appropriate fairness policy can be employed to determine which of the two transactions should be aborted. When a transaction is aborted, all memory addresses in the corresponding address reservation table are cleared.

It should be noted that reservation-snoop messages and operations can be implemented as enhancement of the underlying cache coherence mechanism. A reservation-snoop request can often be piggybacked to a cache coherence request.

A hash table (or bloom filter) can be used to implement an address reservation table. An exemplary address reservation table is an n-bit vector, with k (0<k<n) predefined hash functions. Each hash function maps a memory address to an index to the n-bit vector. Initially each bit in the n-bit vector is cleared to be 0. To record a memory address in the address reservation table, the processor sets all the k corresponding bits in the n-bit vector (according to the k hash functions) to be 1. To check whether a memory address is recorded in the address reservation table, the processor checks all the k corresponding bits in the n-bit vector (according to the k hash functions): the memory address is found only if all the k corresponding bits have been set to 1.

It should be appreciated that the hash table implementation described above allows address reservation information to be recorded with reasonable implementation cost For example, a 128B hash table comprises 1024 bits that can be indexed by the hash functions. If all the bits in the hash table have been set to 1, it means that the whole address space for transactional memory locations is reserved for the transaction.

It should be appreciated that, to allow read-read sharing between transactions, an optimized RRT implementation uses two separate address reservation tables for memory addresses reserved for load operations and memory addresses reserved for both load and store operations. When a transaction performs a memory-reserve-for-load instruction to reserve a memory location for load operations, the memory address is recorded in the corresponding address-reservation-for-load table. Meanwhile, a reservation-snoop-for-load request is sent to other processors. When a snooping processor receives a reservation-snoop-for-load request, the snooping processor checks the corresponding address-reservation-for-load-and-store tables to determine potential read-write conflicts. However, the snooping processor does not need to check its address-reservation-for-load tables because read-read sharing is allowed between transactions.

A challenge of translation from an arbitrary programming level transaction to a transaction supported by RRT hardware is guaranteeing data dependences between memory operations specified in the programming level transaction are preserved. For example, consider FIG. 3A~C. The example assumes that src->balance and dst->balance do not alias.

However, in practice, it may not always be possible to make such guarantees. To illustrate the problem this may cause, consider the case in which src->balance and dst->balance do alias. In this case, the translation shown in FIG. 3C would be incorrect. The reason is that the new value generated for src->balance by the subtraction instruction is stored in a temporary location (not the address of src->balance). When dst->balance is loaded later, since src->balance and dst->balance are the same location, the original value of src->balance is loaded, but the value that should have been read is actually the temporary location in which the new value of src->balance was stored.

There are some options to deal with the problem described above. Possible solutions are presented in the following sections. For the following discussion, we refer to the component that translates programming level transactions to RRT transactions as the translator.

If the translator is capable of guaranteeing that, in a given programming level transaction, for every pair of instructions in which the first instruction is a store and the second instruction is a load later in the code than the first instruction, the two instructions never access the same address, the translator can perform the transformation.

If the translator is capable of guaranteeing that, in a given programming level transaction, for every pair of instructions in which the first instruction is a store and the second instruction is a load later in the code than the first instruction, both instructions always access the same address, the translator can modify the load instruction to use the new temporary address allocated for the store after the translation, effectively renaming the address.

The programming language used by the programmer to write a programming level transaction may be restricted to a programming language for which the translator can guarantee that, in a given transaction, for every pair of two instructions in which the first instruction is a store and the second instruction is a load later in the code than the first instruction, either both instructions always access the same address (and renaming is used for that pair) or the two instructions never access the same address (and reordering is used for that pair).

If the translator cannot guarantee that, in a given programming level transaction, for every pair of two instructions in which the first instruction is a store and the second instruction is a load later in the code than the first instruction, either both instructions always access the same address or the two instructions never access the same address, but can guarantee that all memory accesses access a restricted region of memory, the translator can generate an architecture level transaction that first reserves the entire restricted region of memory identified by the translator (reserving it) and only then executes the code specified in the programming level transaction (with no further renaming or reordering). Notice that in this case, there is no need to store any data in temporary storage because by the time stores from the transaction execute, reservation to all possible addresses the transaction may accesses is already guaranteed.

If the translator is not capable of guaranteeing, for a given programming level transaction, aliasing properties of a pair of instructions in which the first instruction is a store and the second instruction is a load later in the code than the first instruction, the translator can perform the reorder transformation with the store, insert code into the architecture level transaction such that addresses accessed by the store in the pair are recorded in a software temporary address mapping table, together with the temporary addresses in which they were mapped to by the translator. For the load in the pair, the translator would have to generate code that accesses the software temporary address mapping table and then chooses between one of two options: if the software temporary address mapping table contains a mapping for the address of the load, the data is loaded from the mapped temporary address. If the software temporary address mapping table does not contain a mapping for the address of the load, the data is loaded from the address specified originally by the load.

To improve performance, a software signature of all addresses can be generated that includes every entry in the software temporary address mapping table. The software signature is generated and maintained by software (stored in memory). Searching for an address in the software signature is faster than searching for the same address in the software temporary address mapping table because the software signature does not need to be precise.

A possible enhancement to the mechanism for improving performance is to maintain a signature in hardware, instead of maintaining a signature in software. A special instruction would take an address as an input and trigger the hardware to consult the signature in hardware. The output of this special instruction can be used to decide whether to further search the software temporary address mapping table and load from a temporary address, or to load from the address specified by the original load.

Turning now to implementation and optimization, the ART can be implemented by a bloom filter structure. A bloom filter structure allows the insertion of an unlimited number of addresses at the cost of mapping multiple different addresses to the same entry, which could cause increased number of false conflict detection. Although false conflict detection may affect performance of RRT, false conflict detection does not affect correctness of RRT.

A unified address reservation table (UART) has been described. The problem caused by the use of a UART happens when more than one transaction read from a transactional address, but none of them actually writes to this transactional address. Because all reserved addresses of a transaction are recorded in a single ART when a UART is used, it is impossible to tell whether an address has been inserted in the UART by a read reservation or a write reservation. Therefore, it is impossible to determine whether the two conflicting accesses were both reads, and one of the transactions has to be conservatively aborted.

A reservation operation can be triggered by a special instruction or by an access to a special region of memory marked as a reservation triggering memory region.

If the reservation operation is triggered by a special instruction, two approaches can be used. The first approach is to extend load instructions with a bit determining whether its parameter address should be reserved. The second approach is to have a new instruction to reserve an address which, for example, may use the same addressing modes as load instructions. For both approaches, the behavior of this special instruction outside a transaction (i.e. TRAN-PRE state) can be undefined, or the behavior of a regular load instruction.

If the memory region approach is used, the software marks regions of memory (e.g. a page in the page table) before transactions accessing these memory regions are used. When a transaction accesses a reserved memory region in TRAN-RSV state, the hardware automatically detects the access and triggers a reservation operation.

According to the description above, whenever a reservation operation is triggered at a given processor, a reservation request is generated and sent to other processors, even if the address is found in the given processor's cache. This is because the other processors in the system have to be notified of the address reservation.

In order to avoid some of the traffic generated by these reservation requests, an address reservation history table (ARHT) may be employed. When a given address reservation completes at a given processor, besides being added to an ART, the address is also added to the ARHT of the given processor. When a transaction completes, the contents stored in the ART are cleared, but the contents of the ARHT are kept intact. On every ART search caused by a reservation request for a given address received from other nodes, the ARHT is checked. If the given address is found in the ARHT, it is cleared because now another processor may have reserved that same address. When another reservation operation is triggered on the given processor, the ARHT is checked. If the address being reserved is found in the ARHT, no reservation request needs to be sent because no other processor may have reserved that address (otherwise the address would not have been found in the ARHT). For correctness, unlike the ART, the ARHT needs to be implemented with a structure that provides exact or subset encoding addresses (e.g. cache structure). Otherwise, searches of addresses not inserted into the table might return positive, causing the corresponding reservation request for the address not to be sent to other processors, yielding incorrect behavior.

Another possible implementation is to use some of the cache line states as indications that no other cache has tried to reserve a given address. For example, for a MESI protocol, a given cache line in Exclusive state indicates that no other processor shares the given cache line. This information can be used to determine that no reservation request needs to be sent. In order to guarantee correctness of this mechanism, a reservation request needs to change the state of cache lines with the same address as the requested address in processors oilier than the requester to a non-exclusive state (e.g. Shared state of the MESI protocol).

The optimization described above accelerates the reservation only for the processor that previously reserved the address currently being reserved. A drawback is that if a given processor keeps continuously reserving a given address, other processors will always lose a race to the given address. In order to avoid this problem, a fairness mechanism must be aware of this optimization.

RRT and BET can interact in order to provide the best of each mechanism. First, a transaction can be executed by BET hardware, which provides better performance. If the transaction has to be aborted because of overflow reasons, the translation from the aborted programming level transaction can then be executed by RRT hardware. A software manager is responsible for reading BET flags from the hardware and deciding whether an aborted transaction in BET should be re-executed with BET or with RRT.

In order for BET and RRT to work correctly and simultaneously (some simultaneous transactions may be BET and some may be RRT on different nodes of the system), when a receiver receives an incoming snoop requests triggered by BET A_loads and A_stores in a remote processor, the receiver needs to search its local ARTs (only the WART in case of an A_load and both RART and WART in case of an A_store). If an entry is found in any of the searched tables, an abort signal is sent to the requester (BET).

The system software is able to read status registers for every aborted transaction, figuring out the reason of abortion and the conflicting transaction, if any. Based on that, the system software may decide to abort some transactions in order to allow other transactions to complete.

Context switches during the execution of transactions (TRAN-RSV or TRAN-TAIL states) can be handled using two different approaches. The first approach is to abort a transaction whenever the context needs to be switched, but this approach may prevent long transactions to complete. An alternative is to switch out the program while running a transaction, saving its context and locking the ARTs allocated for that transaction such that, while the transaction is not being executed (switched out), conflicts with other transactions are still detected.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
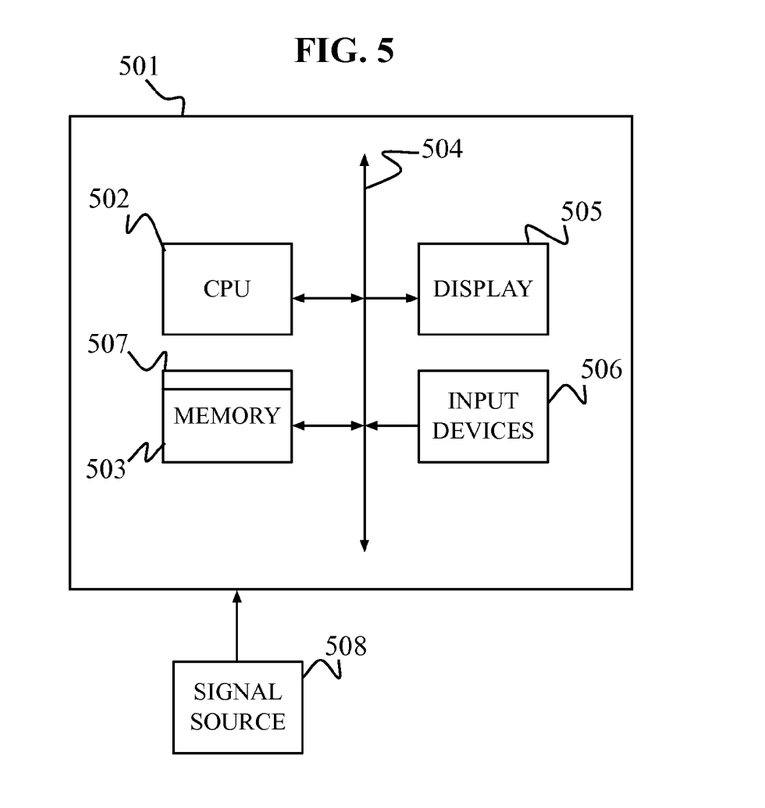
FIG. 5 is a diagram of a system according to an embodiment of the present disclosure.

Referring to FIG. 5, according to an embodiment of the present invention, a computer system 501 implementing RRTs can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, or a combination thereof. The present invention can be implemented as a routine 507 that is stored in memory 503 and executed by the CPU 502 to process the signal from the signal source 508. As such, the computer system 501 is a general-purpose computer system that becomes a specific-purpose computer system when executing the routine 507 of the present invention.

The computer platform 501 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to be further understood that, because some of the constituent system components and methods depicted in the accompanying figures may be implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for supporting RRTs, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A computer readable medium embodying instructions executable by a processor to perform a method for performing a transaction including a transaction head and a transaction tail, the method comprising:
   executing the transaction head, including executing at least one memory reserve instruction to reserve a transactional memory location accessed in the transaction; and
   executing the transaction tail, wherein the transaction cannot be aborted due to a data race on that transactional memory location while executing the transaction tail, wherein data of memory write operations to the transactional memory location is committed without being buffered.

2. The computer readable medium of claim 1, wherein the execution of the transaction head and the execution of the transaction tail are non-overlapping phases.

3. The computer readable medium of claim 1, wherein the at least one memory reserve instruction includes a memory-reserve-for-load instruction to reserve the transactional memory location for load operations, wherein the reserved transactional memory location will only be accessed by memory read operations in the transaction.

4. The computer readable medium of claim 1, wherein no memory write operation to a transactional memory location is allowed in while the transaction head is being executed.

5. The computer readable medium of claim 1, wherein all transactional memory locations, including the transactional memory location, accessed in the transaction are reserved by the execution of the transaction head.

6. The computer readable medium of claim 1, further comprising preventing the execution of the memory write operations to the transactional memory location in the execution of the transaction head.

* * * * *